United States Patent
Sasagawa

(10) Patent No.: US 7,525,589 B2
(45) Date of Patent: Apr. 28, 2009

(54) VIDEO OUTPUTTING METHOD AND DEVICE

(75) Inventor: Mikio Sasagawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 584 days.

(21) Appl. No.: 10/926,061

(22) Filed: Aug. 26, 2004

(65) Prior Publication Data

US 2005/0046725 A1    Mar. 3, 2005

(30) Foreign Application Priority Data

Aug. 27, 2003    (JP)    ............... 2003-303517

(51) Int. Cl.
  *H04N 5/222*    (2006.01)
  *H04N 7/01*    (2006.01)
  *H04N 11/20*    (2006.01)
  *H04N 3/24*    (2006.01)

(52) U.S. Cl. ................ 348/333.12; 348/333.02; 348/445; 348/634

(58) Field of Classification Search ............ 348/445, 348/636, 634–5, 635, 447, 558, 333.01, 556, 348/333.02, 333.07, 333.1, 333.11, 333.12
See application file for complete search history.

(56) References Cited

U.S. PATENT DOCUMENTS 5,699,123 A * 12/1997 Ebihara et al. .......... 348/445
6,463,102 B1 * 10/2002 Linzer ................. 375/240.29
6,765,612 B1 *  7/2004 Anderson et al. ......... 348/231.2
2004/0090556 A1 *  5/2004 Kamieniecki et al. ....... 348/558
2004/0201764 A1 * 10/2004 Honda et al. ........... 348/333.01

FOREIGN PATENT DOCUMENTS

| JP | A-4-091572 | 3/1992 |
|----|-----------|--------|
| JP | A-6-268932 | 9/1994 |

\* cited by examiner

*Primary Examiner*—Sinh N Tran
*Assistant Examiner*—Daniel M Pasiewicz
(74) *Attorney, Agent, or Firm*—Birch, Stewart, Kolasch & Birch, LLP

(57) ABSTRACT

A video outputting method is provided, in which a standard image is displayed, and has a standard aspect ratio. A widescreen (wide) image is displayed, and has a widescreen aspect ratio that is horizontally longer than the standard aspect ratio. Upper and lower blank masked regions are created along and outside upper and lower edges of the standard and widescreen images irrespective of the standard and widescreen aspect ratios. So first and second processed images are created by addition of the upper and lower blank masked regions, for outputting to a widescreen (wide) display device. A lateral blank masked region is created along and outside each one of two lateral edges of the standard image. The first processed image is created further by addition of the lateral blank masked region. The widescreen display device, when the processed images are input, cuts off the upper and lower blank masked regions.

17 Claims, 7 Drawing Sheets

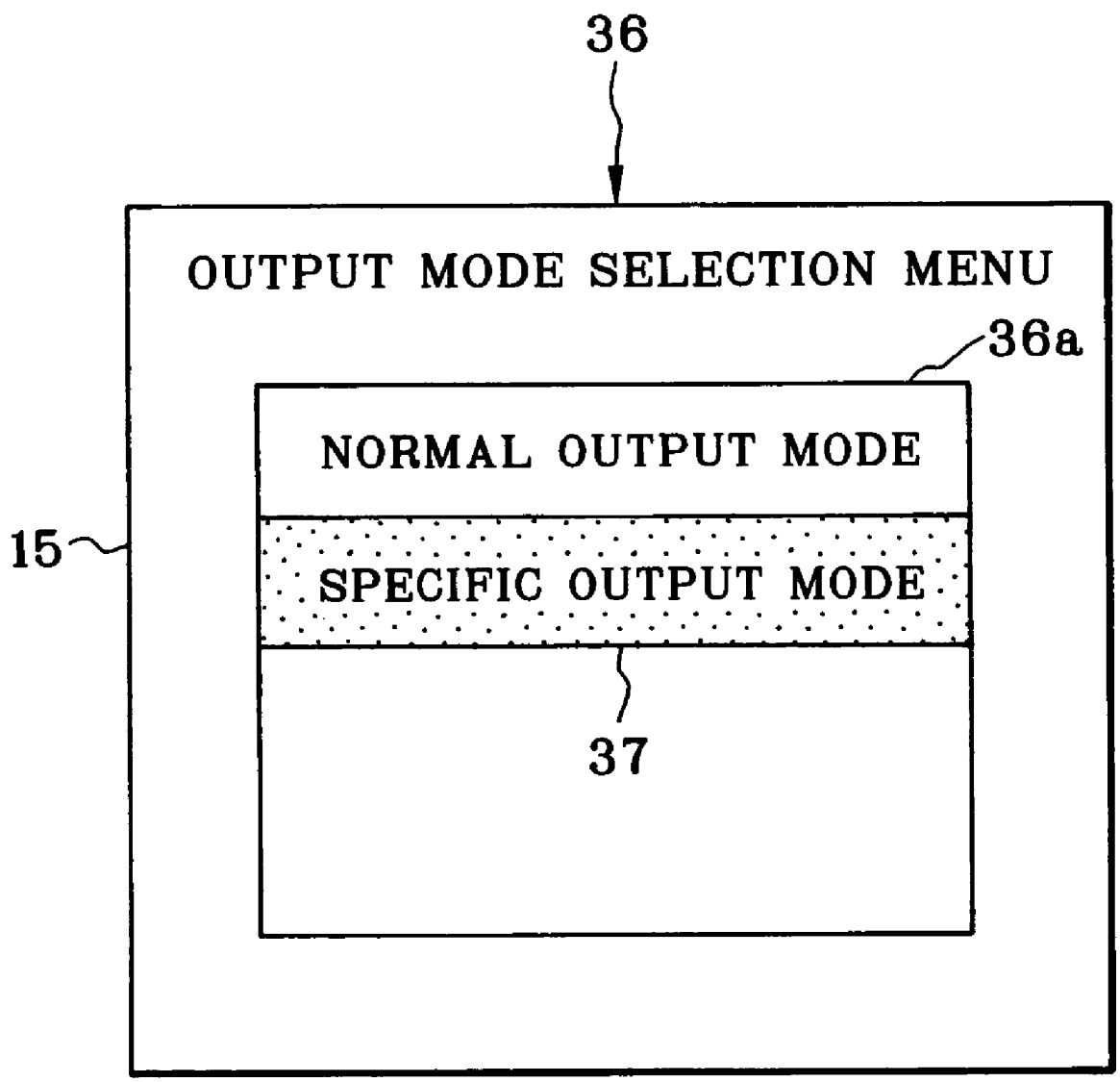

VIDEO OUTPUTTING METHOD AND DEVICE

This Non-provisional application claims priority under 35 U.S.C. §119 (a) on Patent Application No(s). 2003-303517 filed in Japan on Aug. 27, 2003, the entire contents of which are hereby incorporated by reference.

BACKGROUND OF THE INVENTION

1. Field of the Invention

The present invention relates to a video outputting method and device. More particularly, the present invention relates to a video outputting method and device capable of causing a display device to display images with acceptable quality without flickers.

2. Description Related to the Prior Art

There are electronic images with various aspect ratios. Among those, a standard image has a standard aspect ratio of 4/3, and a widescreen (wide) image has a widescreen (wide) aspect ratio of 16/9, which is horizontally longer than the standard aspect ratio. The format of the widescreen image is widely used in video software and broadcast of high-vision or wide clear vision. Video outputting devices, such as suggested in JP-A 4-091572 and JP-A 6-268932, have compatibility, and output video signals to a camera, video player, and a widescreen (wide) display device of which a format is the widescreen aspect ratio. The use of the widescreen aspect ratio has remarkably been spread.

To output a video signal of the widescreen image, upper and lower blank masked regions are added by the video outputting device to image data, to convert an aspect ratio to the standard aspect ratio. Thus, the video outputting device can output video signal in a suitable form to a standard display device having the standard aspect ratio and the widescreen display device.

A conventional type of the standard display device is not suitable for the use of the widescreen image. An error is likely to occur in the standard display device if receiving data of the widescreen image. However, outputting of a video signal of the widescreen image at the standard aspect ratio is effective in reception of the widescreen image by way of the standard image. The standard display device displays an image on its display region in an unchanged form of the video signal. Therefore, the aspect ratio of the display region for the standard image is equal to that of the standard image. Upon reception of the signal of the standard image, the standard image is displayed fully by use of the display region of the standard display device. Upon reception of the signal of the widescreen image, the widescreen image together with the upper and lower blank masked regions is displayed on the display region according to the video signal.

The widescreen display device is constructed to check existence or lack of the upper and lower blank masked regions in response to a video signal, and discerns the widescreen image from the standard image. In case of the widescreen image, the upper and lower blank masked regions are cut away in the widescreen display device to set an aspect ratio according to the video signal equal to that of the display region. Therefore, the widescreen image appears fully in the display region.

Furthermore, digital still cameras has been widely used in recent years. Each of the digital still camera is provided with a video output terminal, which outputs a video signal of an image to a display panel disposed on the rear of a camera body for displaying images on the display panel. If an external display device disconnected with the video output terminal, the camera user is enabled to observe various image by use of the display region of a large side on the external display device.

However, the widescreen display device requires data processing for discernment of the widescreen image from the standard image for the purpose of the displaying operation. If a slide show is desired by outputting of a sequence of plural images including irregularly arranged sets of the standard image and the widescreen image, delay in the processing is likely to cause flickers on the display region, which cannot be watched in an acceptably comfortable manner during the intermediate periods between plural images.

SUMMARY OF THE INVENTION

In view of the foregoing problems, an object of the present invention is to provide a video outputting method and device capable of causing a display device to display images with acceptable quality without flickers.

In order to achieve the above and other objects and advantages of this invention, a video outputting method of outputting video signals to an external display device is provided, the video signals including a video signal of a standard image having a standard aspect ratio, and a video signal of a wide image having a wide aspect ratio that is horizontally longer than the standard aspect ratio. In the video outputting method, when outputting of the wide image is designated, upper and lower blank masked regions are added outside and along upper and lower edges of the wide image, to convert into a first processed image of the standard aspect ratio, for outputting a video signal associated therewith. When outputting of the standard image is designated, a lateral blank masked region is added outside and along a lateral edge of the standard image maintained at the standard aspect ratio, to create an image of the wide aspect ratio, wherein the upper and lower blank masked regions are added outside and along upper and lower edges of the image, to create a second processed image, for outputting a video signal associated therewith.

In a preferred embodiment, a video outputting method for displaying at least a first image having a first aspect ratio, and a second image having a second aspect ratio that is horizontally longer than the first aspect ratio, is provided. In the video outputting method, upper and lower blank masked regions are created along and outside upper and lower edges of the first and second images irrespective of the first and second aspect ratios being different, in order to create first and second processed images by addition of the upper and lower blank masked regions, for outputting to a display device. A lateral blank masked region is created along and outside at least one of first and second lateral edges of the first image, the first processed image being created further by addition of the lateral blank masked region.

The first and second aspect ratios are respectively a standard aspect ratio and a wide aspect ratio, and the first and second images are respectively a standard image and a wide image.

The first and second processed images have the first aspect ratio. The display device has a display region of the second aspect ratio, and in response to a video signal of the first and second processed images, cuts off the upper and lower blank masked regions, displays respectively the first and second images, and displays the lateral blank masked region together with the first image.

A specific output mode and a normal output mode are predetermined in a selectively settable manner. When the specific output mode is set, the first or second processed image is output, and when the normal output mode is set, the first and second images are output without use of the first or second processed image.

Furthermore, mode information of the specific and normal output modes is displayed visually. A selected one of the specific and normal output modes is designated by use of the mode information.

The lateral blank masked region is created along and outside each of the first and second lateral edges.

The lateral blank masked region is created along and outside the first lateral edge.

Furthermore, additional information is displayed in the lateral blank masked region in relation to the first image, the additional information having a form of a character, number, indicia and/or pattern.

According to another aspect of the invention, a video outputting device is provided, and includes an image processing section for creating upper and lower blank masked regions along and outside upper and lower edges of the first and second images irrespective of the first and second aspect ratios being different, in order to create first and second processed images by addition of the upper and lower blank masked regions, for outputting to a display device. The image processing section creates a lateral blank masked region along and outside at least one of first and second lateral edges of the first image, the first processed image being created further by addition of the lateral blank masked region.

The image processing section is set in a selected one of a specific output mode and a normal output mode, and when set in the specific output mode, transmits an output of the first or second processed image, and when set in the normal output mode, transmits an output of the first and second images without creation of the first or second processed image.

The image processing section further produces additional information having a form of a character, number, indicia and/or pattern, in relation to the first or second image, and positioned in the lateral blank masked region.

The video outputting device comprises a digital camera.

Furthermore, an output mode selector is externally operable, for selectively designating one of the specific and normal output modes.

The output mode selector includes a camera display panel for displaying a mode selection pattern constituted by information of the specific and normal output modes. A pointer selects one of the specific and normal output modes by use of the mode selection pattern.

In one preferred embodiment, furthermore, an aspect ratio selector selects one of the first and second aspect ratios, so as to create either of the first and second images according thereto.

The output mode selector is constituted by the aspect ratio selector, and when the first aspect ratio is selected, selects the normal output mode, and when the second aspect ratio is selected, selects the specific output mode.

BRIEF DESCRIPTION OF THE DRAWINGS

The above objects and advantages of the present invention will become more apparent from the following detailed description when read in connection with the accompanying drawings, in which:

FIG. 4 is an explanatory view illustrating a menu pattern of a mode selection menu of output modes;

DETAILED DESCRIPTION OF THE PREFERRED EMBODIMENT(S) OF THE PRESENT INVENTION

Figure 1:
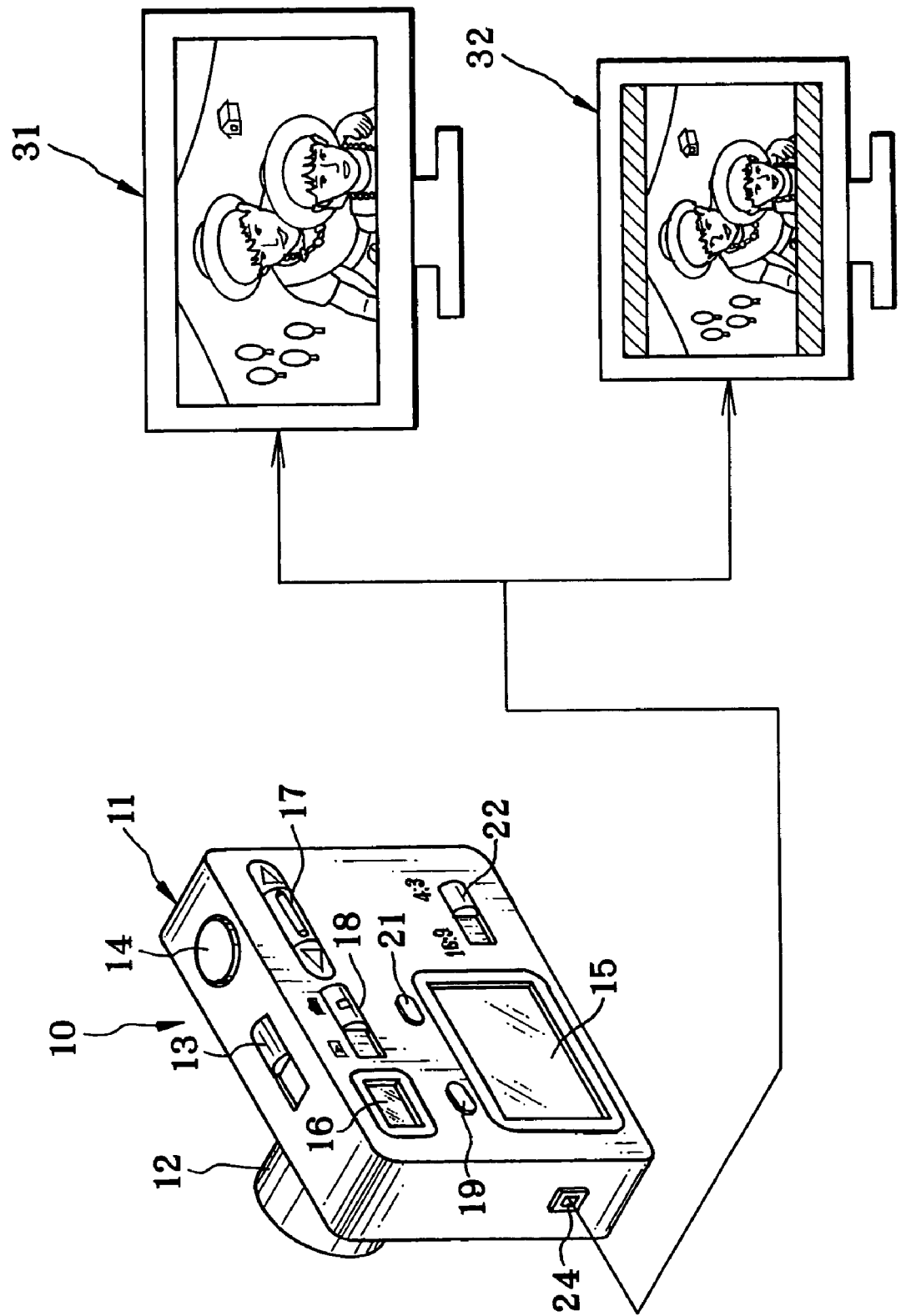
FIG. 1 is a perspective view illustrating a digital still camera.

In FIG. 1, a digital still camera 10 as a video outputting device is illustrated. A lens barrel protrudes from a front of a camera body 11, and constitutes an image pickup unit 12. A top of the digital still camera 10 is provided with a power button 13 and a shutter button 14.

The rear of the digital still camera 10 is provided with an LCD display panel 15, a viewfinder eyepiece window 16, general-purpose keys 17, a camera mode selector 18, a menu button 19, a canceling button 21 and an aspect ratio selector 22.

The camera mode selector 18 is used for a selective designation of an image pickup mode and a playing mode. When the image pickup mode is set, photographed images are written to a memory card. When the playing mode is set, images are read from the memory card, and displayed on a display panel.

The LCD display panel 15 or camera display panel is used for displaying an image, and at the time of the image pickup mode, also operates as an electronic viewfinder for displaying a live image for being framed. The LCD display panel 15 further displays a menu pattern of a setting menu for determining settings or conditions. When the menu button 19 is depressed, the digital still camera 10 is changed over to a setup mode from one of the image pickup mode and playing mode, for the LCD display panel 15 to display the setting menu. This makes it possible to determine various parameters, characteristics and conditions, including exposure amount, color hue, ISO sensitivity, pixel number of recording, setting of a self-timer, selection of photometric settings, existence or lack of use of the digital zoom. The digital still camera 10 is operated as conditioned by use of the menu pattern of the setting menu.

In displaying a live image on the LCD display panel 15, various kinds of information, characters or indicators are displayed together with the live image for representing the settings or conditions being determined. The menu button 19 is operable for a confirming and executing button for a selected item or processing after entry. The canceling button 21 is used to cancel the item or processing being selected if a user wishes cancellation.

The general-purpose keys 17 are operable as a pointer or cursor shifting key for moving a cursor (See FIG. 4) for selection of an image to be played, or selection of one of items in the menu pattern of the setting menu. The general-purpose keys 17 include left and right keys for moving the cursor horizontally, and vertical shifting key for moving the cursor vertically. The left and right keys are pushbuttons. The vertical shifting key is rotatable about a pivotal axis extending horizontally. The vertical shifting key is operable as a zoom button when an image pickup mode is set.

The aspect ratio selector 22 is used to change over the aspect ratio of a frame of the photographed images, and sets a selected one of 4/3 as a standard aspect ratio and 16/9 as a widescreen aspect ratio. It is possible with the aspect ratio selector 22 for a user to select one of the two aspect ratios according to a scene to be picked up. The photographed images are respectively written as a standard image or widescreen image according to the selected aspect ratio.

Figure 6:
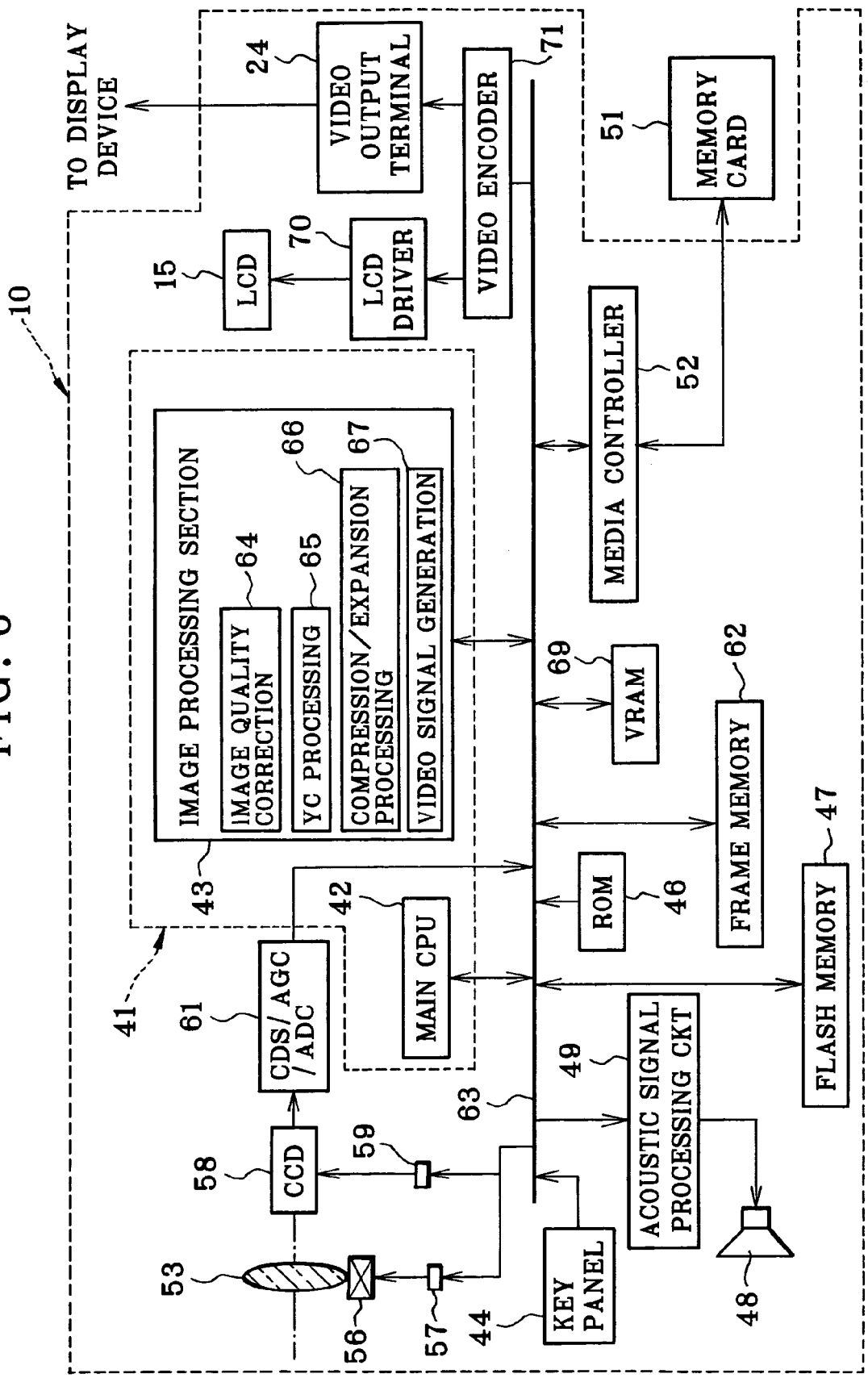
FIG. 6 is a block diagram schematically illustrating circuitry of the digital camera.

To change over the aspect ratios, scanning of a CCD image sensor 58 in an image pickup unit in FIG. 6 can be changed over. Then the number of the pixels of the object image is adjusted to change the aspect ratio. Furthermore, image processing may be used after retrieval of an object image at a predetermined number of pixels. An image portion of a second one of the aspect ratios is extracted from the image of a first one of the aspect ratios. The digital still camera 10 has a construction of the use of the latter. Irrespective of a position of the aspect ratio selector 22, the CCD image sensor 58 retrieves an object image constantly at a standard aspect ratio. If the aspect ratio selector 22 is positioned to set a widescreen aspect ratio, then an image portion with a format of 16/9 is extracted from the standard image. The digital still camera 10 records the extracted image portion as a widescreen image.

A video output terminal 24 is disposed on a lateral face of the camera body 11. The video output terminal 24 sends a composite video signal to a widescreen (wide) display device 31 or a standard display device 32, the composite video signal being a combination of a brightness signal (Y) and a color difference signal (C). When the image pickup mode is set, the video output terminal 24 outputs a video signal of a live image or through image. When the playing mode is set, the video output terminal 24 outputs a video signal of a photographed image being read from a memory card 51. The widescreen or standard display device 31 or 32 being external is connected with the video output terminal 24, so it is possible on a large display area for a user to view photographed images or to monitor a live image.

Figure 2A:
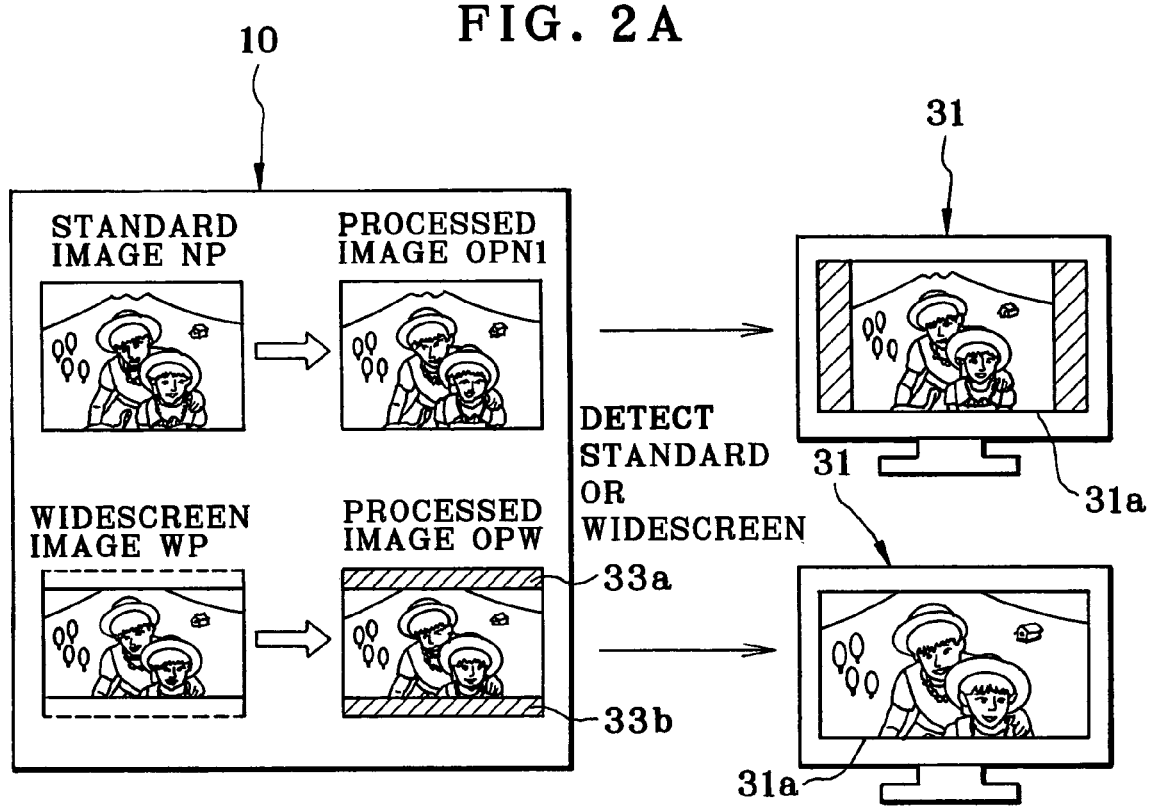
FIG. 2A is an explanatory view illustrating processed images of a normal output mode by use of a widescreen display device.
Figure 2B:
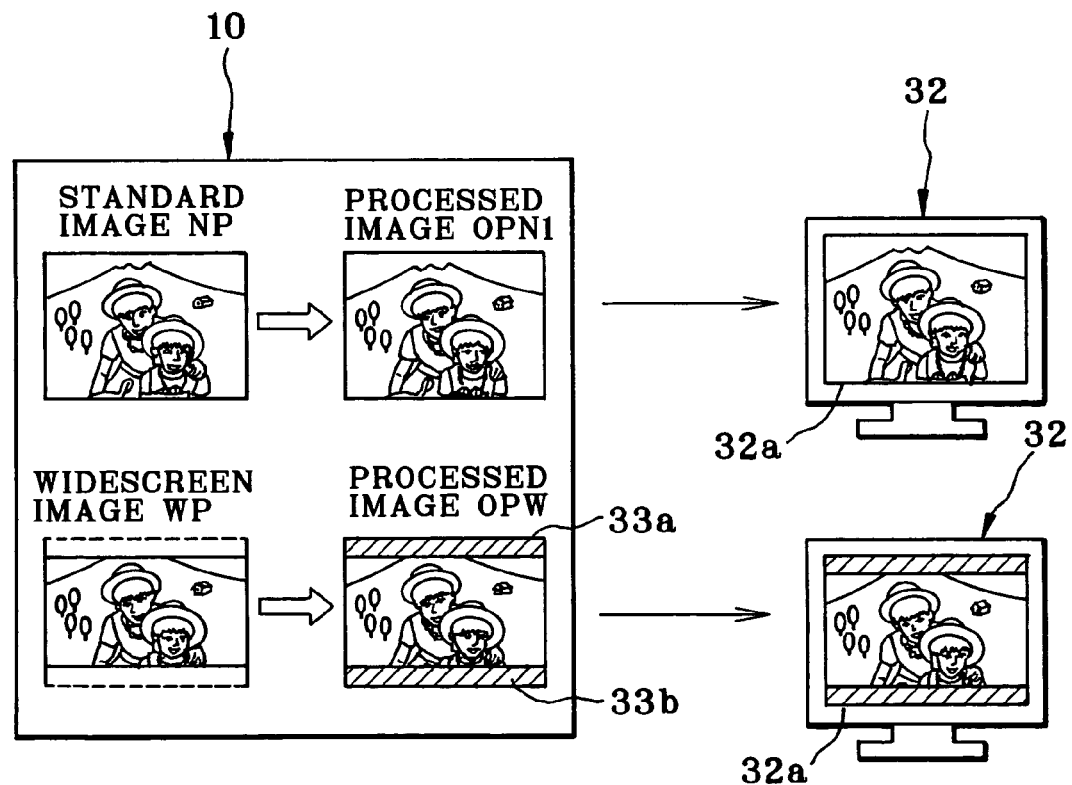
FIG. 2B is an explanatory view illustrating the same as FIG. 2A but by use of a standard display device.
Figure 3A:
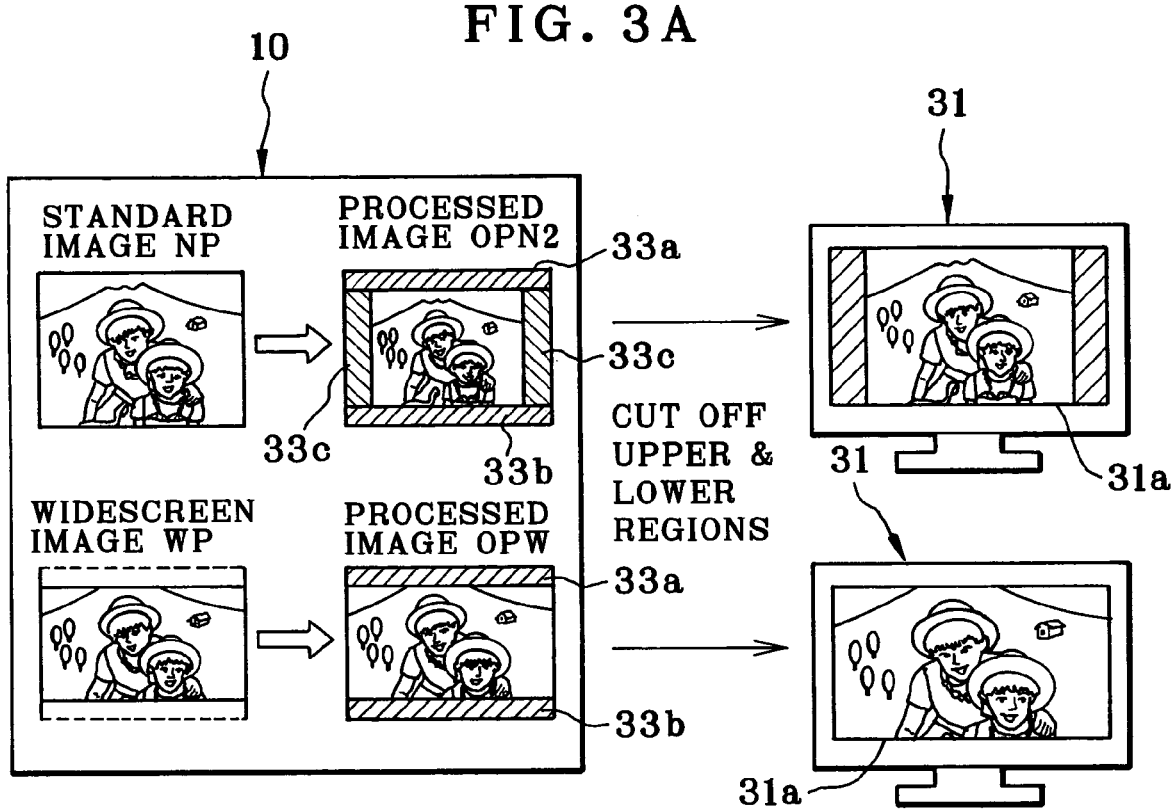
FIG. 3A is an explanatory view illustrating processed images of a specific output mode by use of the widescreen display device.
Figure 3B:
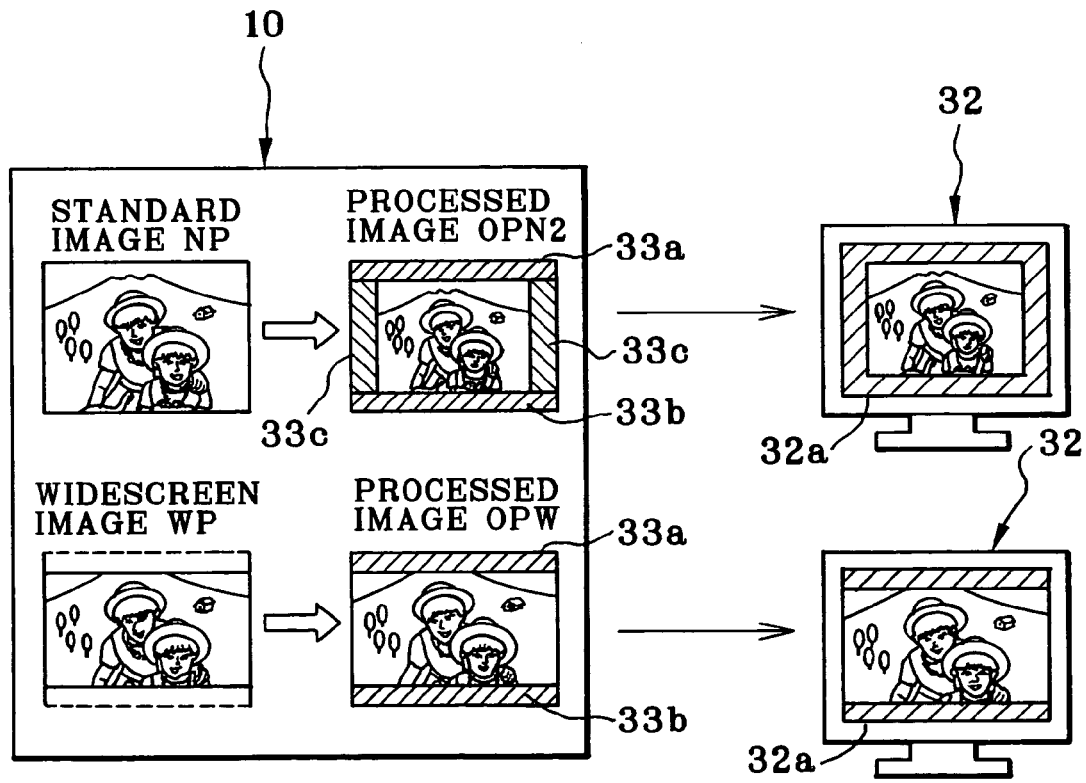
FIG. 3B is an explanatory view illustrating the same as FIG. 3A but by use of a standard display device.

The digital still camera 10 operates in a selected one of two output modes for outputting a video signal from the video output terminal 24. A first one of those is a normal output mode as illustrated in FIGS. 2A and 2B. A second one of them is a specific output mode as illustrated in FIGS. 3A and 3B.

The normal output mode is a condition known in the prior art. In FIGS. 2A and 2B, a standard image NP is output as a processed image OPN1 without changes. A widescreen image WP is provided with upper and lower blank masked regions 33a and 33b added to the outside of upper and lower edges, to produce a processed image OPW, which is converted to a video signal.

In FIG. 2A, the use of the normal output mode is illustrated, in which a video signal is sent to the widescreen display device 31 for displaying an image. In the widescreen display device 31, the processed images OPW and OPN1 are checked for their video signals, to detect one of the aspect ratios according to existence or lack of the upper and lower blank masked regions 33a and 33b. If the video signal is associated with a processed image OPW, then the upper and lower blank masked regions 33a and 33b are cut away. This changes the processed image OPW to an image with an aspect ratio equal to 16/9, namely that of a widescreen (wide) display region 31a. The widescreen image WP is displayed at the full extension. If the video signal is associated with the processed image OPN1, then two lateral blank masked portions are added to the outside of the lateral edges, to set the aspect ratio of the processed image OPN1 equal to that of the widescreen display region 31a.

In FIG. 2B, the use of the normal output mode is illustrated, in which a video signal is sent to the standard display device 32 for displaying an image. A standard display region 32a with a standard aspect ratio displays the processed images OPW and OPN1 in the standard display device 32 without changes. An aspect ratio of the processed image OPN1 is the standard aspect ratio of 4/3, and equal to that of the standard display device 32. Thus, the processed image OPN1 appears in the full area of the standard display region 32a. The processed image OPW is displayed on the standard display region 32a without cutting of the upper and lower blank masked regions 33a and 33b.

In FIGS. 3A and 3B, the specific output mode is depicted. When a widescreen image WP is output, the specific output mode is the same as the normal output mode. In contrast, when a standard image NP is output, lateral blank masked regions 33c are added to lateral edges of the standard image NP. A format of the frame of the image is changed to a widescreen aspect ratio. Also, the upper and lower blank masked regions 33a and 33b are added to the upper and lower edges of the standard image NP, to create a processed image OPN2, which is converted to a video signal.

The widescreen display device 31 discerns a widescreen image WP from a standard image NP by checking existence or lack of the upper and lower blank masked regions 33a and 33b. In the specific output mode, the upper and lower blank masked regions 33a and 33b are added by the digital still camera 10 to both of the standard image NP and the widescreen image WP. Thus, those are both recognized by the widescreen display device 31 as a widescreen image WP. The widescreen display device 31 effects control for display adapted to widescreen images WP.

In FIG. 3A, the use of the specific output mode is illustrated, in which a video signal is output to the widescreen display device 31. To treat the widescreen image WP, the widescreen display device 31 operates for cutting away the upper and lower blank masked regions 33a and 33b from the region of the processed image OPN2 or OPW of the received video signal, so that aspect ratio of the image is changed to the widescreen aspect ratio before the displaying operation on the widescreen display region 31a. If the video signal is associated with the processed image OPW of the widescreen image WP, the upper and lower blank masked regions 33a and 33b are cut away. The side image WP is displayed fully on the widescreen display region 31a. Also for the processed image OPN2 of the standard image NP, the upper and lower blank masked regions 33a and 33b are cut away so as to display the remaining portion in the widescreen display region 31a. Note that the lateral blank masked regions 33c remain added to the processed image OPN2. The widescreen display region 31a displays the lateral blank masked regions 33c directly beside each of lateral edges of the standard image NP.

Therefore, the use of the specific output mode makes it unnecessary in the widescreen display device 31 to check the aspect ratio of a received image according to a supplied video signal, or to change the displaying process according to the plural aspect ratios. The load to the widescreen display device 31 in the displaying process can be reduced. Occurrence of delay in the processing is suppressed. Flickers of the displayed images are prevented. A smooth displaying process is possible even when images of plural aspect ratios are successively displayed one after another. Also, the use of the specific output mode makes it unnecessary to provide the widescreen display device 31 with circuits for changing over the plural displaying processes according to the aspect ratios. The widescreen display device 31 can have a simplified arrangement of circuitry, and can have a reduced cost.

In FIG. 3B, the use of the specific output mode is illustrated, in which a video signal is output to the standard display device 32. The standard display device 32 displays the processed image OPN2 in the standard display region 32a exactly in the received form. In the case of a standard image NP, the upper and lower blank masked regions 33a and 33b are displayed in addition to upper and lower edges of the standard image NP, the lateral blank masked regions 33c being displayed in addition to one lateral edge of the same. In the case of a widescreen image WP, the upper and lower blank masked regions 33a and 33b are displayed in addition to upper and lower edges of the widescreen image WP.

In FIG. 4, a mode selection pattern of a selection menu 36 in the LCD display panel 15 is illustrated, with which the output modes are selected. A mode information region 36a in a box shape indicates two names of the output modes. A cursor 37 is shifted by use of a pointer, for example, of the general-purpose keys 17, and positioned to designate any of the modes as desired by a user.

Figure 5A:
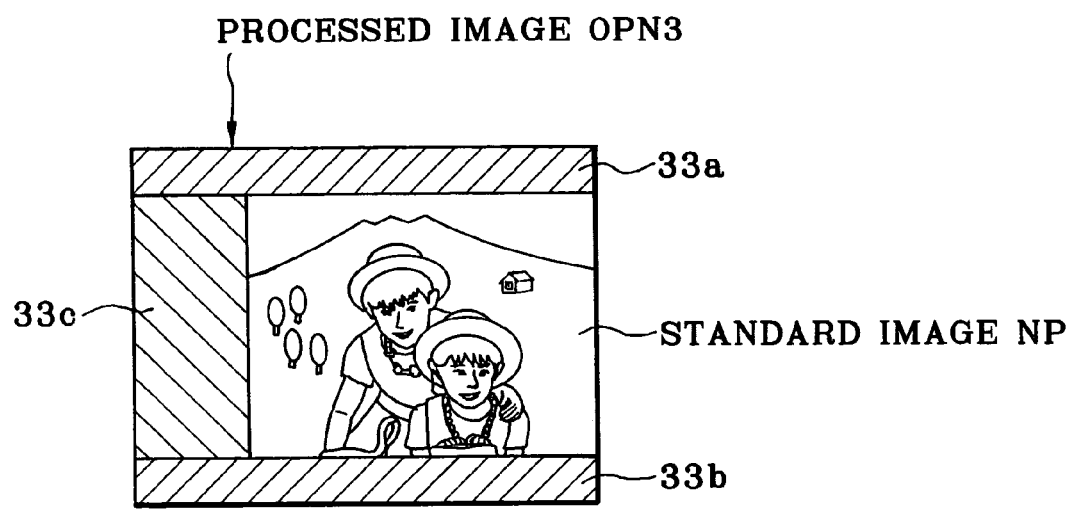
FIG. 5A is an explanatory view illustrating one preferred embodiment in which a single lateral blank masked region is added.
Figure 5B:
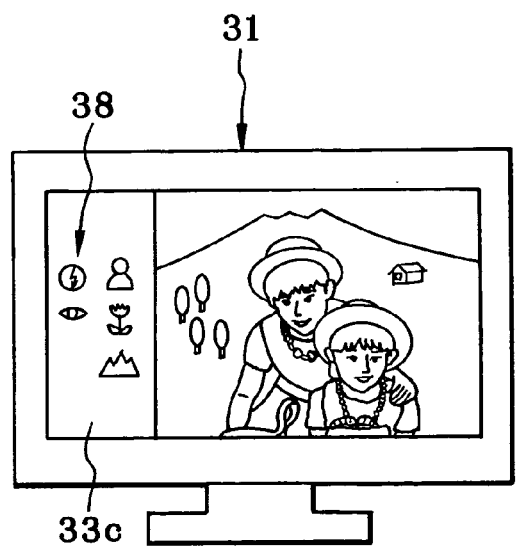
FIG. 5B is an explanatory view illustrating a state of the widescreen display device displaying the standard image.
Figure 5C:
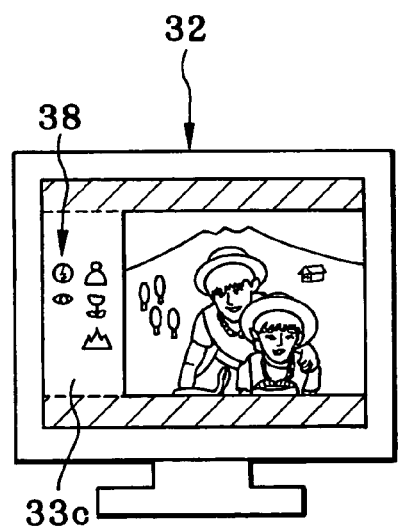
FIG. 5C is an explanatory view illustrating a state of the standard display device displaying the standard image.

In the present embodiment, the specific output mode is to add the lateral blank masked region 33c to each of the two lateral edges of the standard image NP, which is symmetrical at the center. However, it is possible as illustrated in FIGS. 5A, 5B and 5C to position the lateral blank masked region 33c only on one lateral edge of the standard image NP. The disposition of the standard image NP is eccentric. However, there is an advantage in that the single lateral blank masked region 33c is larger than each of the two lateral blank masked regions 33c. The larger area is easy to utilize for various purposes, such as indication of information.

In FIGS. 5B and 5C, use of additional information 38 or indicator is illustrated. The lateral blank masked region 33c is utilized as an information region of the additional information 38, examples of which include various modes such as a flash mode, image pickup mode and the like, image pickup conditions, camera settings and the like. Forms of the additional information 38 are characters, letters, numbers, indicia and patterns as widely used, and are displayed on the standard display device 32 together with a live image. Should the lateral blank masked region 33c not exist, it will be necessary to indicate the additional information 38 in an overlapped manner in the live image. It will be difficult to frame an object because of a considerable lapped area of the image being picked up and the additional information 38. However, the standard image NP of the embodiment is kept offset in one direction so as to utilize the lateral blank masked region 33c as a space for the additional information 38. This facilitates a framing operation because of a separate form of the additional information 38 from the live image.

Note that the effects and advantages of the invention can be achieved when the widescreen display device 31 is used. This is depicted in FIG. 3A. However, the advantage of a large space for indicating the additional information 38 according to FIGS. 5B and 5C can be obtained when both widescreen and standard display devices 31 and 32 are used.

In FIG. 6, circuit elements in the digital still camera 10 are schematically illustrated. A digital signal processor (DSP) 41 is constituted by a main CPU 42 and an image processing section or circuit 43. The main CPU 42 responds to command signals entered from a key panel 44, and controls various sections of the digital still camera 10. A ROM 46 stores a control program run by the main CPU 42, and control data of various kinds, and the like. A flash memory 47 as a well-known type is a non-volatile memory of which rewriting of data is impossible. A user initially sets up information of settings, such as customized output modes, and writes the information to the flash memory 47 at first. A speaker 48 generates acoustic signals of warning sound, and voice or sound associated with motion picture, and the like. An acoustic signal processing circuit 49 is controlled by the main CPU 42 to drive the speaker 48. The memory card 51 stores image data of images being picked up, and is set on the camera body 11 in a removable manner. A media controller or memory card drive 52 accesses the memory card 51, and reads an image file from, and writes an image file to, the memory card 51.

The image pickup unit 12 includes the image pickup optical system and an aperture stop mechanism. The image pickup optical system is constituted by a taking lens 53. A lens moving mechanism 56 is driven by a motor, and moves the taking lens 53. The taking lens 53 is caused by the lens moving mechanism 56 to move back and forth in the optical axis direction. A lens driver 57 is responsive to a command signal from the main CPU 42, controls the lens moving mechanism 56, and changes the magnification and adjusts the focusing.

The CCD image sensor 58 is disposed behind the image pickup optical system as an image pickup element. The CCD image sensor 58 has a photoreceptor surface where a great number of photoreceptor elements are arranged in a matrix form. Object light from an object is passed through the image pickup optical system, and is photoelectrically converted by the CCD image sensor 58 in being focused on the photoreceptor surface. There is a micro lens array for condensing light to respectively pixels. Also, a color filter array is disposed, and includes small filters of red, green and blue colors are arranged regularly for regularized correspondence of the pixels.

The CCD image sensor 58 has a great number of elements or pixels in a matrix form, of which the numbers of lines and rows are determined according to image pickup of an image at 4/3 aspect ratio. A CCD driver 59 sends the CCD image sensor 58 the vertical transfer clock and the horizontal transfer clock, in synchronism with which the CCD image sensor 58 outputs electrical charge as an image pickup signal in a serial form one line after another, the charge being stored for each of the pixels. Charge storing time or exposure time for each of the pixels is determined according to an electronic shutter driving signal generated by the CCD driver 59.

An analog signal processor 61 (CDS AGC ADC) is supplied with the image pickup signal in the analog form generated by the CCD image sensor 58. The analog signal processor 61 eliminates electrical noise from the analog image pickup signal, and also adjusts the gain of the signal, and then converts the signal into a digital signal as image data. This image data is CCD-RAW data, and has density values of the red, green and blue colors for pixels. The CCD-RAW data is sent to the DSP 41.

When the image pickup mode is set, the CCD image sensor 58 starts retrieval of a live image or through image. When the shutter button 14 is depressed fully for a main photographing process, the retrieval of the live image is interrupted in a temporary manner. The main photographing process is conducted. After this, the retrieval of the live image is started again. The live image and mainly photographed image are transmitted by the DSP 41, and written to a frame memory 62.

The frame memory 62 is used as a work memory when the image processing section or circuit 43 processes the image data by signal processing of various kinds. There is a data bus 63 where the frame memory 62 is connected to the DSP 41. An example of the frame memory 62 is SDRAM (synchronous DRAM). Images written to the frame memory 62 are read and processed by the DSP 41 for image processing of various kinds.

The image processing section or circuit 43 includes an image quality correction unit 64, a YC processing unit 65, a compression/expansion processing unit 66, and a video signal generation unit 67. The image quality correction unit 64 processes the image by correction processing, which includes gamma correction, sharpness correction, contrast correction and the like. The YC processing unit 65 converts the CCD-RAW data into YC data constituted by brightness data and color difference data. The compression/expansion processing unit 66 processes the YC data by the compression and expansion. Shortly before writing the image data to the memory card 51, the image data is compressed by the compression/expansion processing unit 66. In the playing mode, the DSP 41 responds to entry of image data read from the memory card 51, and subjects the image data to the expansion processing.

The video signal generation unit 67 creates processed images for causing the widescreen or standard display device 31 or 32 to display images in a selected one of the image pickup mode and the playing mode. The video signal generation unit 67 adds information of the upper and lower blank masked regions 33*a* and 33*b* and the lateral blank masked regions 33*c* to the image data, to transmit a signal of a processed image to the LCD display panel 15 or externally to the widescreen or standard display device 31 or 32 through the video output terminal 24.

Figure 7:
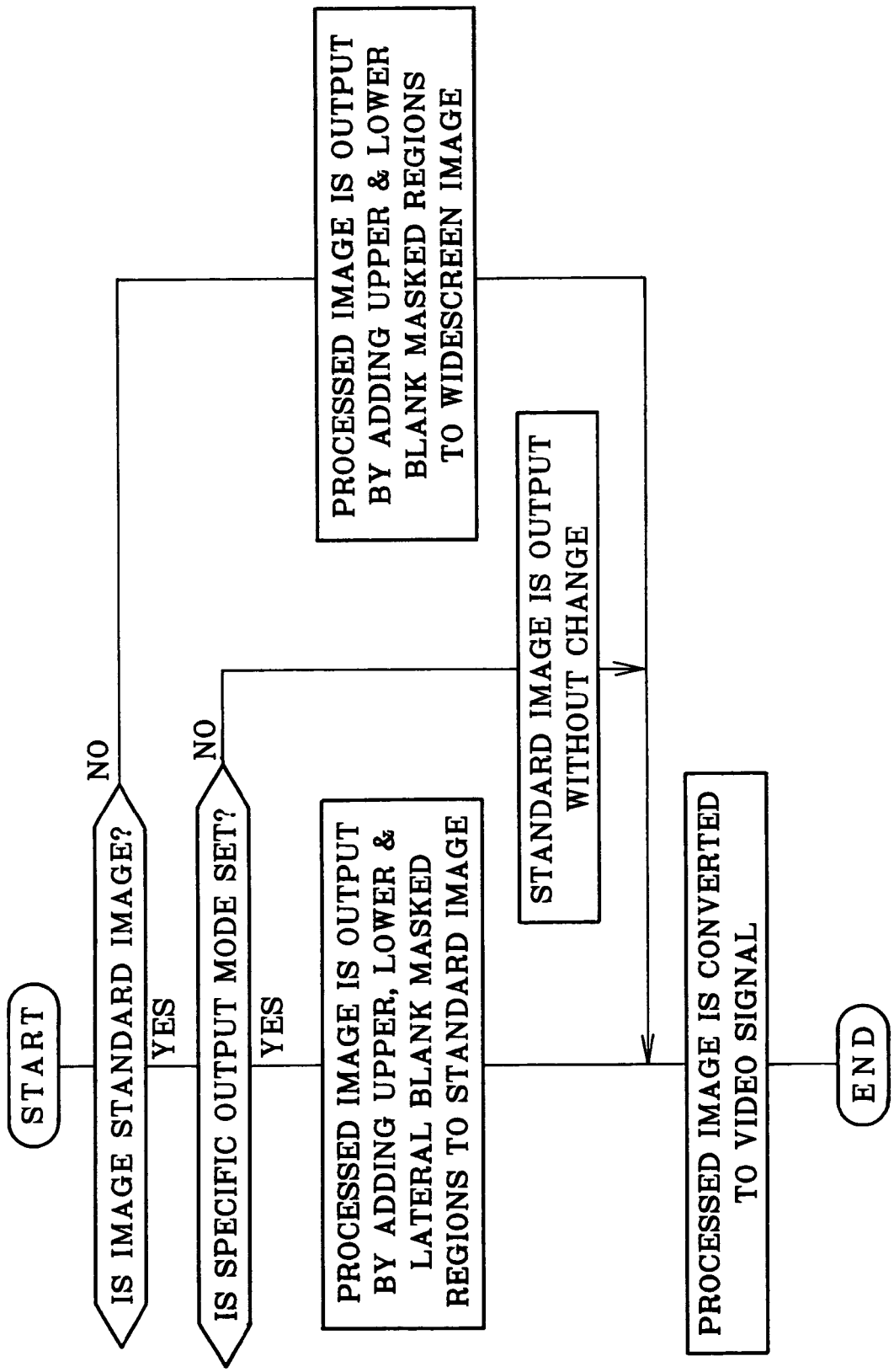
FIG. 7 is a flow chart illustrating a process of producing processed images.

In FIG. 7, a flow of the operation is illustrated. The video signal generation unit 67, at first, detects an aspect ratio of an image according to image data. If the image is a widescreen image WP, the upper and lower blank masked regions 33*a* and 33*b* are added to the image to produce an output of a processed image OPW.

If an image is a standard image NP, then a processed image is produced by considering a designated one of the normal and specific output modes. At the time of the normal output mode, the standard image NP is output as processed image OPN1 without adding a blank masked portion. At the time of the specific output mode, the upper and lower blank masked regions 33*a* and 33*b* and the lateral blank masked regions 33*c* are added to the standard image NP, to create the processed image OPN2 and send its video signal.

A VRAM (video RAM) 69 is a memory for use in outputting images. Processed images are output by the video signal generation unit 67 and written to the VRAM 69. A video encoder 71 reads processed images from the VRAM 69, and converts those of the digital form into a video signal, which is a composite signal of an analog form. The video signal is output to an LCD driver 70 or to the video output terminal 24. The LCD driver 70 drives the LCD display panel 15 according to the video signal.

The operation of the above construction is described now. When the digital still camera 10 is set in an image pickup mode, the LCD display panel 15 is caused to display a live image or through image. The video output terminal 24 sends a video signal of the live image to an external display apparatus. In displaying the live image, the DSP 41 processes the image data from the CCD image sensor 58 for image quality correction and YC processing, so a processed image is produced by image processing according to one of the normal and specific output modes being selected. When the shutter button 14 is depressed, the main image is written to the memory card 51. An aspect ratio of the live image or main image is according to the setting according to positioning the aspect ratio selector 22.

In the playing mode, the DSP 41 processes the image data from the memory card 51 by expansion, and subjects the expanded image data to a video outputting process. This process is according to a selected one of the output modes, in a manner similar to the live image. In the specific output mode, the upper and lower blank masked regions 33*a* and 33*b* are added to each of the widescreen image WP and the standard image NP. If a sequence of plural images include widescreen images WP and standard images NP in an irregularly mixed manner, the widescreen display device 31 can process the received image signals all in a common manner of widescreen images. Accordingly, load applied in the displaying process is reduced. Images can be displayed smoothly without periods of considerable flickering on the display region.

In the present embodiment, the selection of the output modes is effected by use of the mode selection pattern of the selection menu 36. However, it is possible for the digital still camera to have a mode selection button or output mode selector similar to the aspect ratio selector. This is effective in facilitating the handling, because one of the output modes can be discerned visually according to the shifted position of the output mode selector.

Furthermore, the selection of the aspect ratios and the selection of the output modes can be associated with one another. In general, a user who regularly uses the widescreen display device 31 is supposed to have considerable frequency of selecting the widescreen aspect ratio in using the digital still camera 10. In contrast, a user who regularly uses the standard display device 32 is supposed to have considerable frequency of selecting the standard aspect ratio in using the digital still camera 10. In consideration of this, it is preferable that the aspect ratio selector 22 is also operable for output mode selector, sets the normal output mode when the standard aspect ratio is set, and sets the specific output mode when the widescreen aspect ratio is set.

In the above embodiment, the video outputting device is the digital still camera. However, a video outputting device of the invention may be any type of electronic device for imaging. In the above embodiment, one of the normal output mode and specific output mode can be selected. However, it is possible to omit the normal output mode, and always to set the specific output mode in outputting a video signal.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A video outputting method of outputting video signals to an external display device, said video signals including a video signal of a standard image having a standard aspect ratio, and a video signal of a wide image having a wide aspect ratio that is horizontally longer than said standard aspect ratio, said video outputting method comprising steps of:

when outputting of said wide image is designated, adding upper and lower blank masked regions to said wide image outside and along upper and lower edges of said wide image, thereby creating a first processed image of said standard aspect ratio such that said first processed image contains image data representing said wide image and said upper and lower masked regions, for outputting a video signal associated therewith; and when outputting of said standard image is designated, adding a lateral blank masked region to said standard image outside and along a lateral edge of said standard image maintained at said standard aspect ratio, to create an image of said wide aspect ratio, wherein said upper and lower blank masked regions are added outside and along upper and lower edges of said image of said wide aspect ratio, to create a second processed image such that said second processed image contains image data representing said standard image and said upper, lower, and lateral masked regions, for outputting a video signal associated therewith;

wherein said video outputting method is performed by a single video outputting device.

2. A video outputting method as defined in claim 1, wherein a specific output mode and a normal output mode are provided in a selectively settable manner;

when said specific output mode is set, said video signal associated with said second processed image is output;

when said normal output mode is set, a video signal according to said standard image is output without adding said upper and lower blank masked regions and said lateral blank masked region.

3. A video outputting method as defined in claim 2, further comprising steps of:

displaying mode information of said specific and normal output modes visually;

designating a selected one of said specific and normal output modes by use of said mode information.

4. A video outputting method as defined in claim 1, wherein said lateral blank masked region is created along and outside each of first and second lateral edges of said standard image.

5. A video outputting method as defined in claim 1, wherein said lateral blank masked region is single, and created along and outside one of two lateral edges of said standard image.

6. A video outputting method as defined in claim 1, further comprising a step of displaying additional information in said lateral blank masked region in relation to said standard image, said additional information having a form of a character, number, indicia and/or pattern.

7. A video outputting method as defined in claim 1, wherein said masked region comprises a continuous area of an image file containing pixels of a set color.

8. A video outputting method as defined in claim 1, further comprising a step of displaying additional information in one of said upper or lower blank masked regions in relation to said wide image, said additional information having a form of a character, number, indicia and/or pattern.

9. A video outputting device of outputting of images to an external display device, said images including a standard image having a first aspect ratio, and a wide image having a second aspect ratio that is horizontally longer than said first aspect ratio, said video outputting device comprising:

an image processing section for creating at least one blank masked region in a periphery of said standard and wide images;

wherein when outputting of said wide image is designated, said image processing section adds upper and lower blank masked regions to said wide image outside and along upper and lower edges of said wide image, thereby creating a first processed image of said first aspect ratio such that said first processed image contains image data representing said wide image and said upper and lower masked regions, for outputting a video signal associated therewith; and wherein when outputting of said standard image is designated, said image processing section adds a lateral blank masked region to said standard image outside and along a lateral edge of said standard image maintained at said first aspect ratio, to create an image of said second aspect ratio, wherein said upper and lower blank masked regions are added outside and along upper and lower edges of said image, of said second aspect ratio, to create a second processed image such that said second processed image contains image data representing said standard image and said upper, lower, and lateral masked regions, for outputting a video signal associated therewith.

10. A video outputting device as defined in claim 9, wherein said image processing section is set in a selected one of a specific output mode and a normal output mode, and when set in said specific output mode, transmits a video signal according to said second processed image and when set in said normal output mode, transmits a video signal according to said standard image without adding said upper and lower blank masked regions and said lateral blank masked region.

11. A video outputting device as defined in claim 10, wherein said image processing section further produces additional information having a form of a character, number, indicia and/or pattern, in relation to said second processed image, and positioned in said lateral blank masked region.

12. A video outputting device as defined in claim 10, wherein said video outputting device comprises a digital camera.

13. A video outputting device as defined in claim 12, further comprising an output mode selector, externally operable, for selectively designating one of said specific and normal output modes.

14. A video outputting device as defined in claim 13, wherein said output mode selector includes:

a camera display panel for displaying a mode selection pattern constituted by information of said specific and normal output modes; and a pointer for selecting one of said specific and normal output modes by use of said mode selection pattern.

15. A video outputting device as defined in claim 13, further comprising an aspect ratio selector for selecting one of said first and second aspect ratios, so as to create either of said standard and wide images according thereto.

16. A video outputting device as defined in claim 15, wherein said output mode selector is constituted by said aspect ratio selector, and when said first aspect ratio is selected, selects said normal output mode, and when said second aspect ratio is selected, selects said specific output mode.

17. A video outputting device as defined in claim 9, wherein said external display device is physically separate from the video outputting device.

* * * * *